United States Patent
Friedell

[15] 3,675,894
[45] July 11, 1972

[54] EYELID HYBRID BUTTERFLY TYPE POPPET VALVE

[72] Inventor: Morley V. Friedell, Wheatridge, Colo.

[73] Assignee: Martin Marietta Corporation, New York, N.Y.

[22] Filed: Dec. 3, 1969

[21] Appl. No.: 881,779

[52] U.S. Cl. ............................ 251/163, 251/192, 251/315, 251/308
[51] Int. Cl. ................................................. F16k 25/00
[58] Field of Search .................. 251/158, 162, 163, 192, 315, 251/308

[56] References Cited

UNITED STATES PATENTS

| | | |
|---|---|---|
| 1,595,038 | 8/1926 | Venel ..................................... 251/158 |
| 2,673,061 | 3/1954 | Broz ..................................... 251/163 X |
| 2,847,180 | 8/1958 | Ludeman ............................... 251/163 |
| 3,033,513 | 5/1962 | Vulliez .................................. 251/163 |
| 3,477,690 | 11/1969 | Murota .................................. 251/163 |
| 3,498,583 | 3/1970 | Friedell ................................. 251/162 |

FOREIGN PATENTS OR APPLICATIONS 1,184,986   2/1959   France .................................... 251/163

Primary Examiner—Harold W. Weakley
Attorney—Phillip L. De Arment and Gay Chin

[57] ABSTRACT

A cylindrical valve body carries a semi-spherical pocket outside of the axial flow path which receives an eyelid, hybrid butterfly type poppet valve of similar configuration and which may be selectively rotated to a position coaxially with an annular valve seat and then axially advanced to valve closed position.

3 Claims, 4 Drawing Figures

PATENTED JUL 11 1972  3,675,894

INVENTOR
MORLEY V. FRIEDELL

BY *Sughrue, Rothwell, Mion, Zinn & Macpeak*

ATTORNEYS

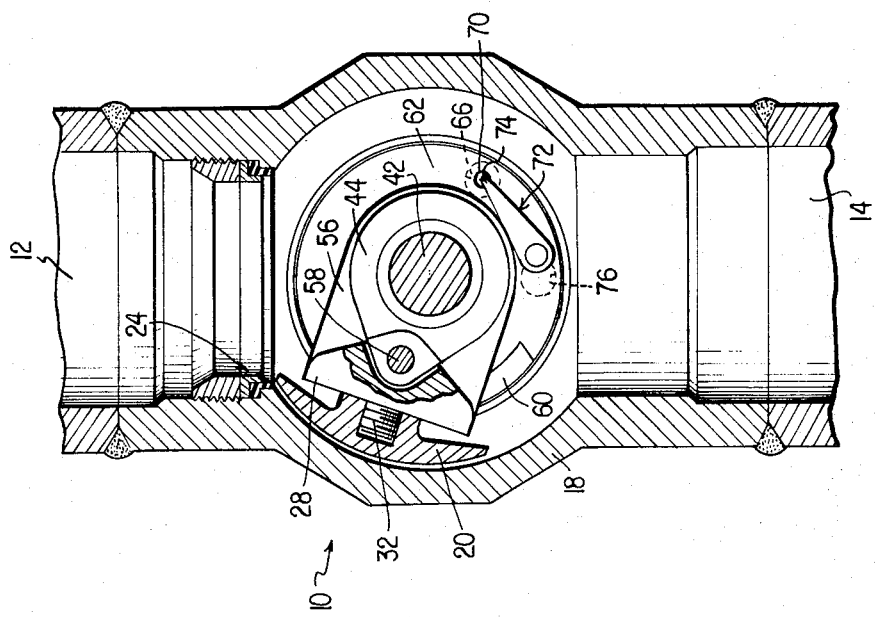
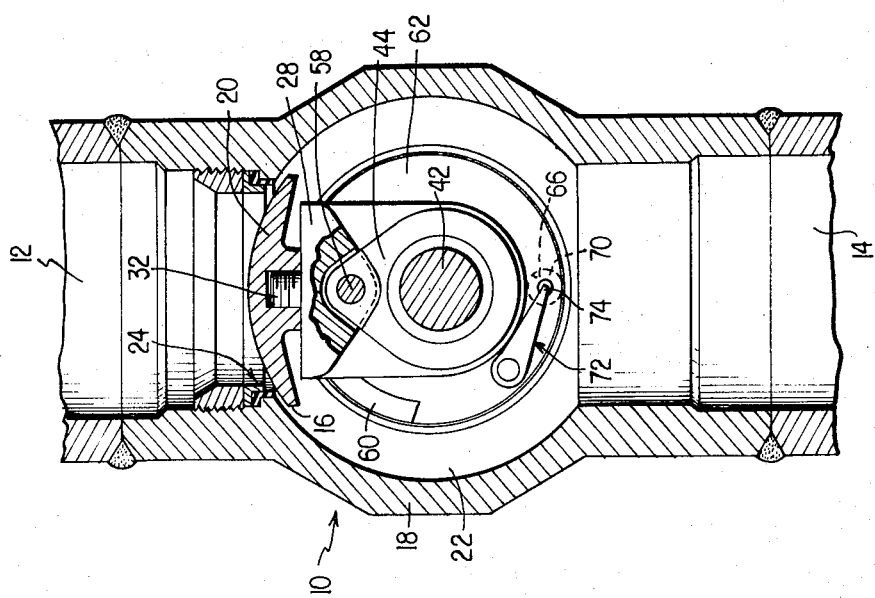

3,675,894

EYELID HYBRID BUTTERFLY TYPE POPPET VALVE

BACKGROUND OF THE INVENTION

1. Field of the Invention

This invention relates to butterfly valves, and more particularly to those involving compound movements of the type called hybrid butterfly poppet valves.

2. Description of the Prior Art

Butterfly poppet valves of the type in the referred-to application operate by a cam-transition mechanism for movement of the valve disc under rotation from a valve open position where the disc lies essentially parallel to the flow axis of the valve body, to a flow-traversing position at right angles to said axis with the closure disc then being moved axially into contact with an annular valve seat to shut off flow through the valve. Opening constitutes a reverse operation to the above.

Hybrid butterfly poppet valves of this type require positive stops or other means to prevent continued rotation to and from positions parallel to the flow path and at right angles thereto during opening and closing of the valve. The valve disc, even when in a fully open position and parallel to the flow, lies within the flow path and greatly affects the maximum flow ratio of fluid through the valve conduit carrying the same. Further, the interlocks or positive stop means for preventing over rotation or over shifting are both complicated and costly.

SUMMARY OF THE INVENTION

This invention is directed to a simplified hybrid butterfly poppet valve which employs as a valve poppet, a spherical segment or "eyelid" which drops completely out of the flow stream into a semi-spherical pocket in the side of the valve body. This arrangement is particularly useful when a traveling or partial flow is required since the poppet is perfectly balanced under flow conditions and requires very low actuating forces to operate the valve over the entire flow range from full flow to complete shut off. Specifically, a cylindrical valve casing is modified to provide a semi-spherical side pocket which protrudes outwardly, with the flow axis intersecting the center of curvature forming the same. The rotating shaft is supported by opposed bearing members on opposite sides of the valve body such that its axis passes through the center of curvature of the semi-spherical pocket. The "eyelid" butterfly type valve disc is configured to rest within the pocket supported by rotatable and axially shiftable support links. A control plate and guide plate to one side of valve controls the extent of angular rotation of the support links and the axial extension of the links and the valve after rotation to a position coaxially with the flow path. A spring biased control ball selectively locks the control plate to the guide plate to insure axially shifting of the eyelid valve disc and its support links subsequent to rotation from full open to full closed angular position. Eccentric means effect shifting of the eyelid disc and the support links when the semi-spherical eyelid is coaxially positioned with respect to the circular valve seat. The control mechanism positively positions the eyelid poppet valve with relation to the rotation of the shaft and permits the poppet to rotate directly with the shaft from a full open position to a precisely located position in line with the poppet seat and then translates directly to final closure and sealing. It locks the poppet in retracted position during rotation and locks it against rotation during the final closure cycle while the valve poppet advances toward or retracts from the annular sealing seat.

BRIEF DESCRIPTION OF THE DRAWINGS

FIG. 3 is a sectional view of the valve similar to that of FIG. 2 with the "eyelid" valve poppet in retracted position.

FIG. 4 is a sectional view of the valve of FIG. 1 similar to that of FIGS. 2 and 3, with the "eyelid" valve poppet in fully open position.

DESCRIPTION OF THE PREFERRED EMBODIMENT

Figure 2:
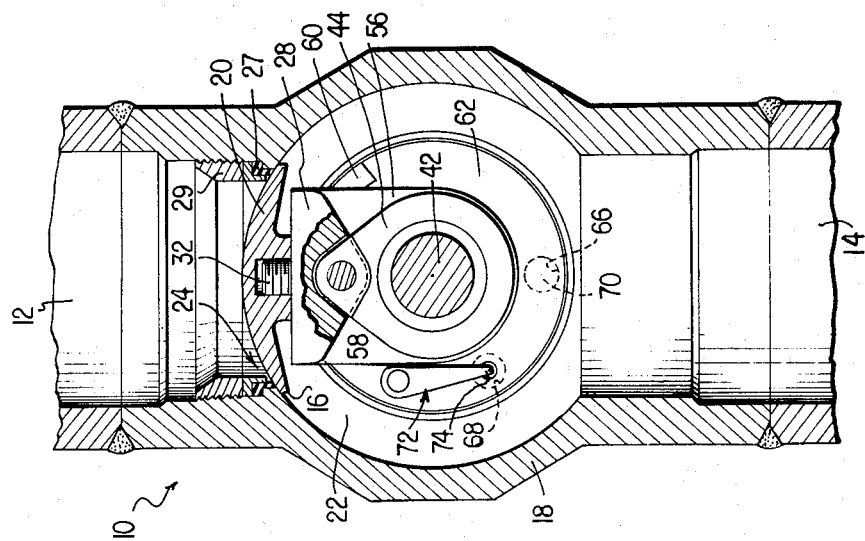
FIG. 2 is a sectional elevational view of the valve shown in FIG. 3, with the "eyelid" valve poppet in fully closed position.

Referring to the drawings, the "eyelid" hybrid butterfly type poppet valve assembly of the present invention consists of a cast metal or machined tubular valve casing or housing 10 formed of stainless steel or the like, being generally cylindrical in configuration. The housing 10 has open ends 12 and 14, end 12 constituting an inlet 12 with the opposite end 14 constituting an outlet downstream of the poppet. Of course, the valve operates regardless of the direction of flow. However, if the fluid is corrosive, it should be stored upstream of the poppet to protect the actuating mechanism. As shown, the cylindrical housing 10 is flanged at one or more ends to facilitate coupling of the valve to suitable conduits (not shown) carrying the fluid to be controlled thereby. Of particular importance is the fact that the side wall of the housing is provided with a semi-spherical protruding portion 18 which defines a semi-spherical pocket 22 for receiving the "eyelid" butterfly type valve poppet or closure 20 when the valve is in fully opened position. In this respect, it is noted that the valve poppet 20 is, on its outer surface, a segment of a sphere with the inside contour-shaped for maximum strength and uniform stress. The outer surface of the poppet, which is preferably formed of stainless steel, is highly polished to define a seating face. The poppet is center supported for uniform peripheral loading and springing. The valve poppet 20 is so configured that its peripheral edge 16 lies generally outside of the flow path defined by the main bore of the housing 10, when fully opened. The valve seat 24 is carried by the cylindrical housing 10 and is defined by a shoulder 26 carried by housing 10, a resilient Teflon annulus 27 which is clamped against the shoulder 26 by a seal clamping ring 29. Annulus 27 therefore acts as a seal for the valve disc 20 when it is in the fully closed position as seen in FIG. 2.

A bridge or yoke 28, preferably formed of stainless steel, supports the poppet and in turn is supported and guided at its outer ends by a pair of eccentrically mounted links 44, being guided by guide recesses 48 and 49, respectively, on opposite sides of the valve casing 10. The bridge is designed as a high rate spring. Threaded screw 32 couples the valve poppet 20 to bridge 28. Controlled movement of the eyelid poppet 20 is achieved by rotation of the actuating or control shaft 30 which is supported on opposite sides of housing 10 by being journalled within bearing heads 34. The bearing heads 34, of cast or machined construction, are bolted to casing or housing 10 by a series of threaded bolts 35. The periphery of the shaft 30 is recessed and carries O ring seals 36 to prevent fluid escape along the shaft. One end of the shaft terminates in a rectangular projection 38 which extends outwardly from the casing 10 and, in particular, the right hand bearing head, for coupling to a power drive shaft 39 when power driven, but may be operated by a manual operating lever, (not shown) if desired, to cause the necessary rotation of the shaft to open and close the valve. Portion 42 of the shaft is eccentrically enlarged and carries links 44 on roller bearings 46 which fit between the openings in the links and the shaft received thereby. The guide recesses 48 and 49 receive the rotatable and radially shiftable bridge support links 44. Bridge 28 further carries integral, apertured, guide legs 54 and 56 which are coupled to the outer end of links 44 by suitable pins 58. The section or portion 42 of the shaft is machined to define an integral eccentric which transmits a closing force to the bridge and poppet along the axis of the valve casing through the paired links and pins.

Figure 1:
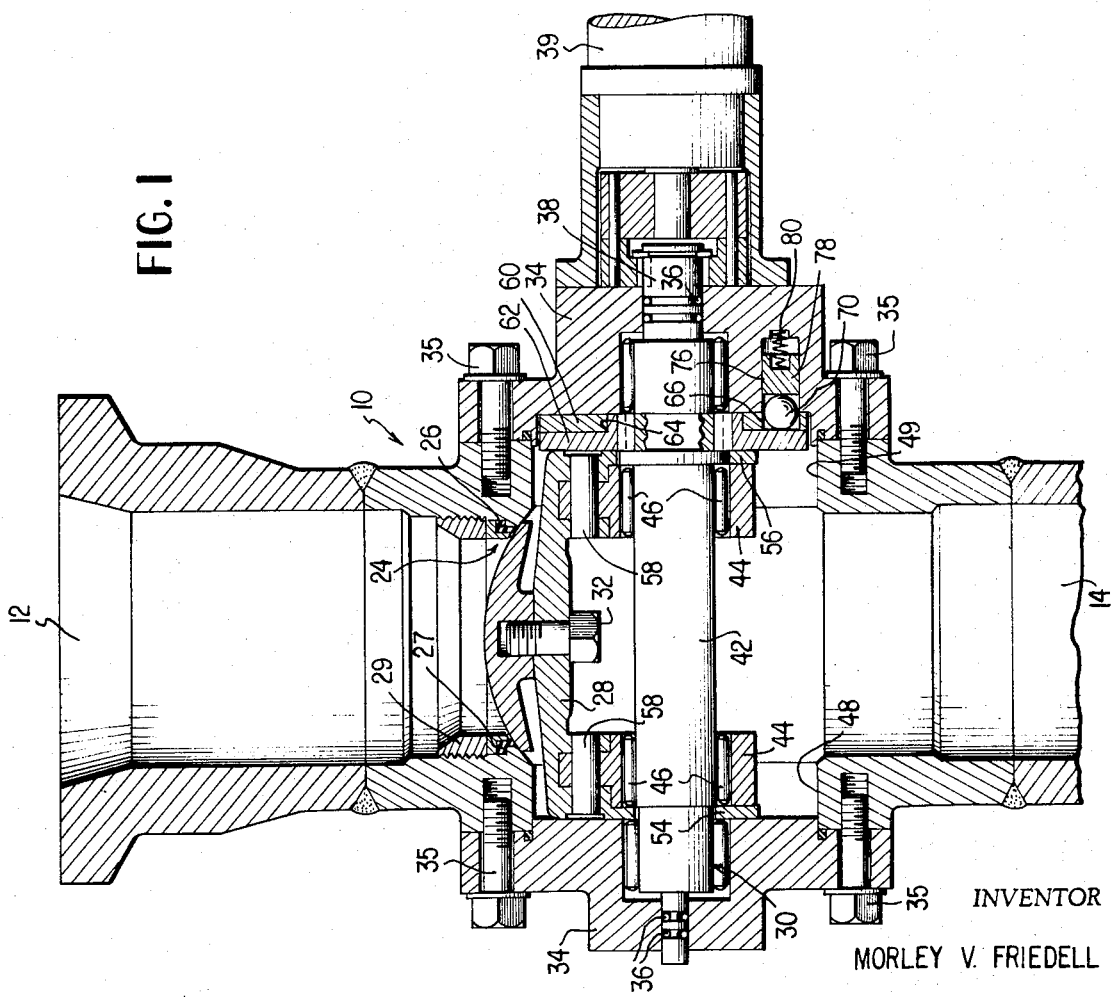
FIG. 1 is a top plan view partially in section of the proposed eyelid hybrid butterfly type poppet valve of the present invention.

Further, a drive plate 62 is keyed to the shaft 30 and rotates with it. A control plate 60 is coaxially mounted on drive plate 30 and keyed to the bearing housing during poppet movement axially toward and away from the seat, this being controlled by the eccentric portion of the shaft 30. In this respect the drive plate 62 is provided with a peripheral recess 64 on its right hand face, as shown in FIG. 1 to thus support annular control plate 60. The control plate 60 carries a cylindrical hole 66 of a diameter corresponding control ball 70. Likewise, the drive plate 62 is provided with a semi-spherical recess 68 which partially receives ball 70 during closure of the valve, the drive plate 62 also carries a cantilevered spring 72 whose free end 74 protrudes through a small diameter hole coaxial with the semi-spherical recess 68, the spring tending to force the control ball 70 out of the semi-spherical recess. Right hand bearing head 34 carries an axially aligned bore 76 and a plunger 78 which is biased outwardly by spring 80.

The operation of the control plate and the drive plate to facilitate selective axial shifting of the spherical poppet and then rotation approximately 60° as illustrated in FIGS. 2, 3 and 4, is identical to that of the referred-to application. Briefly, the drive plate is keyed to the shaft and rotates with it. It keeps the control plate keyed to the bearing housing during the poppet movement toward and away from the seat. During this time, the control plate 62 is in such a position angularly with respect to the drive plate, that the spherical recess 68 is not aligned with the cylindrical hole 66, in which case the flush surface of the control plate causes the ball 70 to shift towards the right from that shown in FIG. 1 and is partially received within bore 76 and the circular hole 66 to securely lock the drive plate to the bearing head. In the absence of alignment between the semi-spherical recess 68 of the drive plate and the circular hole 66 within the control plate, the flat inner surface of the control plate forces the control ball 70 to move to the right, FIG. 1, against the bias of spring 80, allowing the drive plate to rotate but preventing the rotation of the control plate 60. In fact, with the control ball 70 centered equidistantly between bore 76 of the stationary housing bearing head 34 and hole 66 of the control plate, the control plate is keyed to the bearing housing during poppet movement toward and away from the seat. With reference to the drawings, this condition exists during movement of the poppet from the fully closed position of FIG. 1 to the retracted position of FIG. 3. At the 60° point in rotation of the shaft, FIG. 3, the spherical recess 68 of the drive plate moves into coaxial position with the cylindrical hole 66 in the control plate, allowing the control ball to move to the left, FIG. 1, under the bias of the spring 80 releasing the control plate from the bearing housing and, at the same time, keying the control plate to the drive plate. Any continued rotation of the drive plate, which is keyed to the shaft, causes rotation of the control plate. Since the control plate is coupled to the valve poppet 20 through bridge 28, during the next 60° of shaft rotation, the poppet is tilted to the position shown in FIG. 4 to one side of the now open fluid flow passage and within the pocket formed by the spherical enlarged section or portion 18 of the valve casing.

In effect, 120° of shaft rotation is required to move the valve from fully closed to fully open position and vice versa. The reverse action occurs when the valve is closed. The transition occurs at 60° bottom position in either direction. It is impossible for the poppet to cam outward unless the drive plate is released from the control plate and the control plate in turn is keyed to the bearing housing. In similar fashion to the valve assembly of the referred-to application, the present valve is provided with limit switch position controls for both the open and closed poppet position to protect the motor at each extreme of operation. Under the present design, no pressure surge or shock can cause the poppet to open or fail, nor may any conceivable back surge, vibration, or other condition, cause the valve to fail shut, either before or during flow. For aerospace applications, the poppet, shaft bridge and bearings are designed to withstand the static load of 12,500 pounds, proof loads of 11,000 pounds (3,000 psi) and an operating load of 7,250 pounds (2,000 psi). By supporting the links close to the main shaft bearings, minimum shaft bending forces are developed under closing load and the shaft size can be kept to a minimum. Preferably, the main shaft bearings and link bearings are 440 stainless steel needle, electrolysis nickel plated shell, roller bearings. The shaft in this environment also comprises stainless steel. In the design, poppet loading is effected by having the poppet contact the compressed Teflon seat before top dead center. When the valve is then cammed to top dead center, a load is developed on the poppet to seal the valve and support the pressure load. In this respect, both of the bridge guide legs are provided with enlarged openings which receive the shaft to allow the necessary radial translation of the bridge and center coupled spherical poppet, once the poppet is in line with the seat. The valve poppet seal is composed of an L-shaped stainless steel slip ring, the seal being compressed between the slip ring and the body by a threaded stainless steel clamp ring. The tolerances and pressures applied assure complete cold flow filling of the cavity formed between the body and the slip ring with the Teflon seal. There is no sliding of the poppet on the Teflon seal. The Teflon is forced into the cavity in the same direction as the poppet force is applied, although some lateral force is developed as a result of poppet seal angle. In particular, the present valve is designed to handle hydrogen peroxide. Since hydrazine has no problem with most metals and very slight problem with elastomers, material compatibility is achieved. Further, the propellants are preferably retained above the poppet until the valve is fully opened. Thus, only the poppet, poppet seal and housing are exposed to the propellant for any length of time. The actuating mechanism, including the shaft, bridge bearings, actuator, etc., are exposed a very short time during operation.

Advantageously, the mechanism shown allows short rotational movement of the shaft in which camming or closure occurs during only 90° of shaft rotation with poppet opening occurring from 70° to 90°. This is in contrast to the referred-to application in which 180° of rotation of the shaft and eccentric causes retraction or advancement of the poppet while 90° rotation of the shaft and poppet places the poppet valve parallel with the flow stream, thus necessarily using a total rotation of the shaft of 270° from fully open to fully closed position.

In the design of the present valve, the stroke or vertical movement of the valve is the minimum required to provide pressure loading in the closed position, and suitable clearance between the seat and poppet in the open and swinging position. This, in turn, provides the greatest mechanical advantage in the camming/closing operation. The poppet is center-loaded to allow even springing. The bridge or yoke is side supported to provide the most open flow path for fluid medium while allowing engagement with the control mechanism. This also insures that not only the "eyelid" valve lies outside of the flow path, but also the major portion of the control or operating mechanism, as best evidenced when viewing FIG. 4. This also allows the valve to be used as a high rate, moderately stressed spring for applying a desired preload to the pocket. By supporting the load very closely to the main shaft bearings, a minimum bending moment is developed and the shaft diameter as well as the resulting flow restriction may be kept at a minimum. The shaft of course is centered with respect to the flow, and its size should be kept to as small a diameter as possible.

The valve has application to general industry where large capacity valves with low operating power of effort requirements are desirable, such as remote, radio-controlled or electrically operated valves in the petroleum or chemical industries, as well as servo and hand operated valves in general. In particular, the valve structure of the present invention is light weight, quick in operation, and has low power requirements which are of vital importance to applications in the aerospace and aeronautic fields.

WHAT IS CLAIMED IS:

1. In a butterfly poppet valve of the type employing a valve poppet pivoted from an axially, in-line, closed position with respect to a valve seat formed within a tubular valve housing, to a valve open position at some angle thereto, the improvement comprising:

a semi-spherical pocket formed within said housing generally exterior of the axial flow path through said housing, an "eyelid" type poppet valve disc having a surface facing said pocket of similar configuration to that of said pocket, a shaft including an eccentric portion extending through said housing at right angles to the axis thereof and intersecting the center of curvature of said pocket, means defining a circular valve seat opening within said housing to one side of said shaft, a bridge spanning the width of said valve seat opening, means fixing said valve disc to said bridge for movement into valve closing position, links pivotably coupled to said bridge on respective sides with openings therein receiving said shaft eccentric portion, the length of said links and the radial dimensions of said disk and said bridge relative to said shaft axis being such that rotation of said shaft and said links in unison causes swinging of said bridge and said disc angularly away from said circular valve seat and into position within said pocket and generally outside the flow path upon full opening of said valve.

2. The butterfly poppet valve as claimed in claim 1, further comprising means for selectively locking said bridge to said shaft to cause rotation of said bridge, said links and said disc in unison to effect movement of said disc into axial alignment with said circular valve seat and means for selectively unlocking said shaft from said bridge during further rotation of said shaft to cause said eccentric portions of said shaft to shift said disc axially to complete closure of said valve.

3. The butterfly poppet valve as claimed in claim 1, further comprising a control plate operatively coupled to said bridge and rotatable therewith, a drive plate in juxtaposition to said control plate and fixed to said shaft, a recess in said drive plate, a hole within said control plate in axial alignment with said recess, a recess in said housing in axial alignment with said drive plate recess and said control plate hole, a ball within said housing recess, and means spring biasing said ball toward said drive plate recess.

* * * * *